United States Patent [19]

Jirka

[11] 4,402,039
[45] Aug. 30, 1983

[54] TELEPHONE LINE CIRCUIT

[75] Inventor: Howard F. Jirka, Crystal Lake, Ill.

[73] Assignee: Bell Telephone Laboratories, Incorporated, Murray Hill, N.J.

[21] Appl. No.: 299,156

[22] Filed: Sep. 3, 1981

[51] Int. Cl.³ .................................... H02M 3/335
[52] U.S. Cl. ............................... 363/21; 179/18 FA
[58] Field of Search .............. 179/18 FA; 363/20, 21, 363/95, 97

[56] References Cited

U.S. PATENT DOCUMENTS

| 4,011,410 | 3/1977 | Thomas | 179/2.5 R |
| 4,056,689 | 11/1977 | Freimanis | 179/16 F |
| 4,119,806 | 10/1978 | Baratin | 179/18 FA |
| 4,124,884 | 11/1978 | Episcopo | 363/21 |
| 4,335,423 | 6/1982 | Koizumi et al. | 363/21 |
| 4,347,559 | 8/1982 | Sturgeon | 363/21 |

*Primary Examiner*—William M. Shoop
*Attorney, Agent, or Firm*—K. H. Samples; R. T. Watland

[57] ABSTRACT

A floating, constant power, battery feed circuit wherein a single transformer is used to perform the functions of battery feed and audio coupling. AC feedback is used to control the dynamic output impedance of the circuit. To achieve a constant dynamic output impedance, the amount of AC feedback is controlled by the DC output voltage, which in turn depends on the loop resistance. To achieve a constant audio gain from the switching network to the subscriber set, the audio signal from the switching network is multiplied by a signal representing the DC output voltage.

12 Claims, 12 Drawing Figures

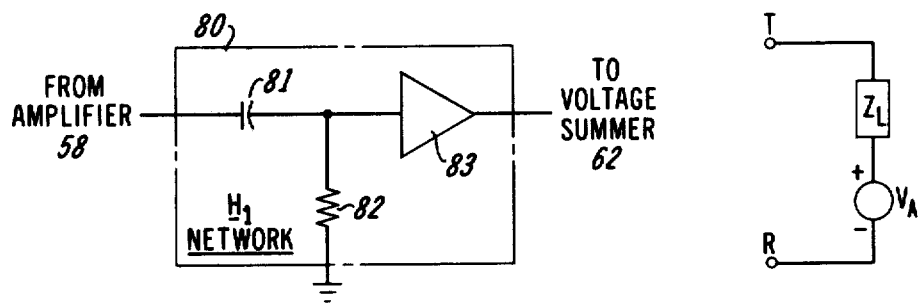
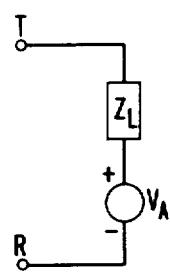
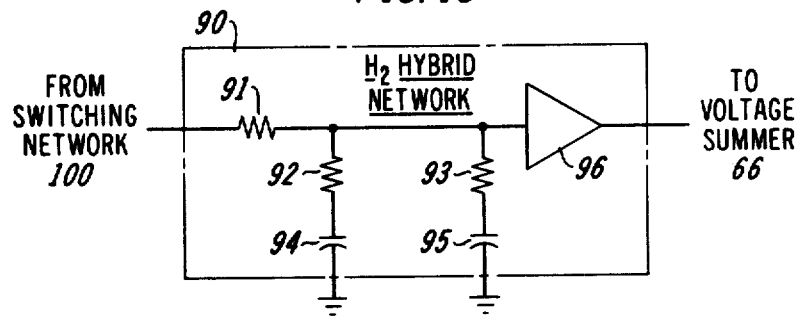
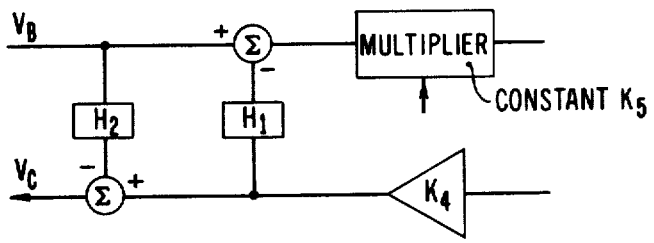
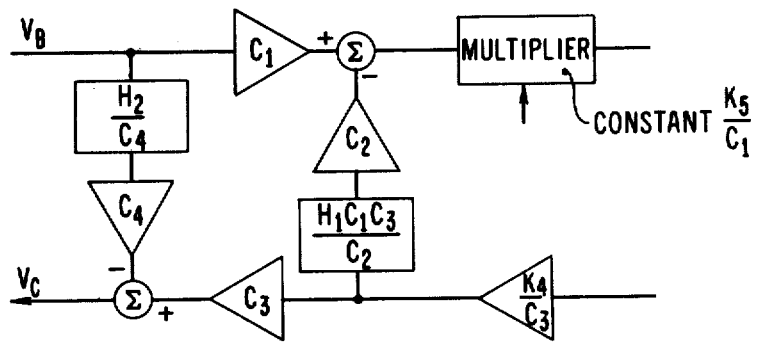

TELEPHONE LINE CIRCUIT

TECHNICAL FIELD

This invention relates to telephone line circuits and, more particularly, to such circuits including a floating battery feed.

BACKGROUND OF THE INVENTION

In telephone systems, line circuits serve as an interface between communication lines connected to subscriber sets and the telephone switching network. Traditionally, the line circuit has included a battery feed to energize the subscriber set. It has been recognized that the effect of longitudinal currents, which are frequently induced in a subscriber loop because of nearby electrical power lines, can be minimized when the battery feed is capable of floating with respect to ground. Known line circuits have implemented a floating battery feed by using a transformer to isolate the subscriber set from the battery. In such circuits, a second transformer is typically used to provide audio coupling between the subscriber set and the switching network. Because these transformers represent a significant fraction of the total cost and space requirements of the line circuits in which they are included, a line circuit which efficiently utilizes a single transformer both to pass energizing current to the subscriber set and to provide audio coupling between the switching network and the subscriber set has an obvious advantage over corresponding two-transformer circuits.

In accordance with one known line circuit, a transformer is used to energize a subscriber set by supplying a voltage at the circuit output terminals which is substantially independent of the length or DC resistance of the subscriber loop. Audio signals are passed between the switching network and the subscriber set using the same transformer. Although the advantage inherent in using a single transformer is achieved, constant voltage circuits supply currents to short, low-resistance loops far in excess of the current required to energize the subscriber sets and their use is, therefore, not energy efficient. A second, known single-transformer circuit provides a substantially constant current to the subscriber set independent of loop length. However, conventional subscriber sets are equipped with varistors, which advantageously act to limit the audio signals transmitted from and received by sets connected to short, low-attenuation loops. If constant current is supplied to such conventional sets, this desirable, loop-dependent varistor operation is no longer possible.

It has been determined that a battery feed which supplies a substantially constant magnitude of power independent of loop length is significantly more energy efficient than a constant voltage circuit and still allows for the use of varistors to limit audio signals on short loops. However, the dynamic output impedance of a constant power circuit will typically vary with the DC resistance of the subscriber loop, which may make the circuit incompatible with PBXs or other electronic circuits that terminate the loop. The present invention is a floating, constant power, battery feed circuit advantageously utilizing a single transformer to perform both the battery feed and audio coupling functions and having a predetermined, loop-independent, dynamic output impedance.

SUMMARY OF THE INVENTION

A power supply in accordance with the present invention includes a voltage-applying circuit for applying a DC voltage to a load such that a substantially fixed magnitude of DC power is supplied to the load independent of its DC resistance and for applying an AC voltage to the load. The power supply also includes a feedback circuit coupled to the load for generating a return signal representing the voltages applied to the load and a filter circuit for separating the return signal into a DC component and an AC component. A divider generates a feedback signal that is substantially directly proportional to the quotient resulting from the division of the AC component of the return signal by the DC component of the return signal and a control circuit responds to the feedback signal by controlling the magnitude of the AC voltage applied to the load.

BRIEF DESCRIPTION OF THE DRAWING

A more complete understanding of the present invention may be obtained from a consideration of the following description when read in conjunction with the drawing in which:

FIGS. 6, 7, 8 and 10 represent particular realizations of circuits included in the line circuit shown in FIG. 5;

FIG. 9 is a circuit diagram of an AC equivalent of a load shown in FIG. 5;

FIG. 11 is a circuit diagram of a portion of the line circuit shown in FIG. 5; and FIG. 12 is an alternative embodiment of the circuit shown in FIG. 11.

DETAILED DESCRIPTION

Figure 1:
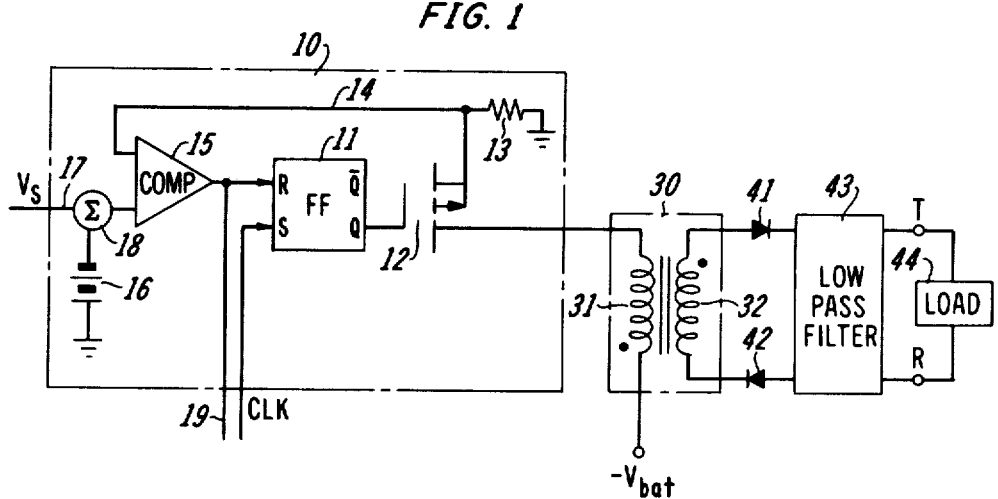
FIG. 1 is a circuit diagram of a switching-mode, flyback power converter which is incorporated in a line circuit in accordance with the present invention, as is shown in FIG. 5.

FIG. 1 is a diagram of a switching mode, flyback power converter, which is used in a line circuit in accordance with the present invention. The converter comprises a power driver 10, a transformer 30 having a primary winding 31 and a secondary winding 32, a pair of diodes 41 and 42 and a low pass filter 43. The converter receives energy from a 48 volt battery, which has a grounded positive terminal and a negative terminal designated $-V_{bat}$, and supplies a floating output voltage to a load 44 via a pair of terminals, T and R.

Figure 2:
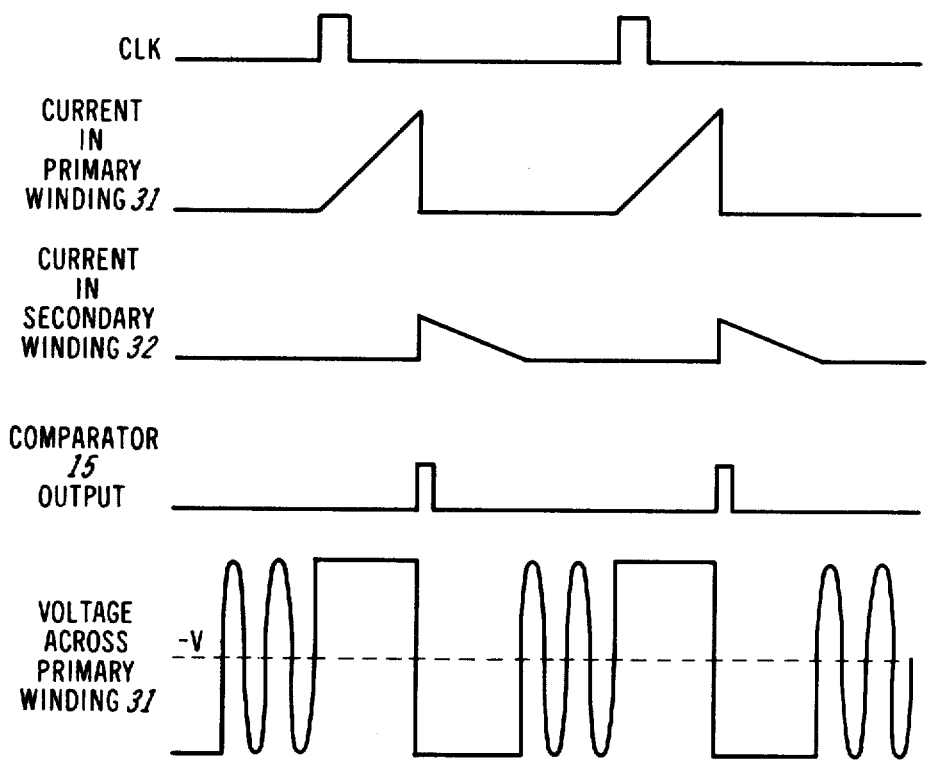
FIGS. 2 and 3 illustrate various current and voltage waveforms pertinent to the power converter shown in FIG. 1.
Figure 3:
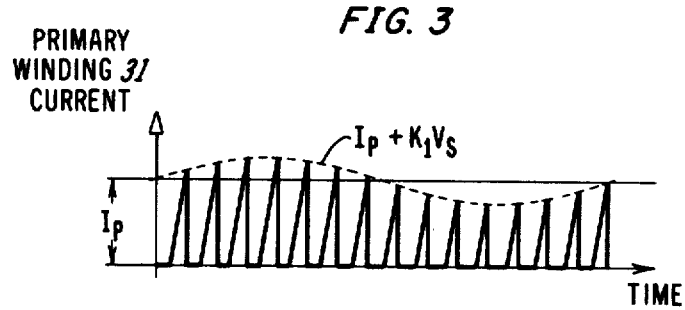

Power driver 10 operates in conjunction with a 256-kilohertz, $12\frac{1}{2}$ percent duty cycle clock signal, which is received at a terminal designated CLK. Each clock pulse received sets a flip-flop 11, thereby turning on a field-effect transistor 12, which serves as a switch to apply voltage to primary winding 31. The polarity of secondary winding 32 with respect to primary winding 31 is such that diodes 41 and 42 are reverse biased and no current flows in secondary winding 32. A linearly increasing ramp of current begins to flow in primary winding 31 (FIG. 2). The slope of this ramp depends on the inductance, L, of winding 31 but is independent of load 44 because of the reverse biasing of diodes 41 and 42. As current flows in primary winding 31, a proportional voltage, which is referred to as a monitor signal, is developed across a series-connected resistor 13 and that voltage is applied via a conductor 14 to a first input terminal of a voltage comparator 15. A second input terminal of comparator 15 receives the output signal from a voltage summer 18 which sums an audio-representing AC control signal voltage, $v_s$, on a conductor 17 and a DC voltage developed by a reference source 16. When the current in primary winding 31 increases to the point that the voltage on conductor 14 is equal to the output signal from voltage summer 18, comparator 15 generates a pulse which resets flip-flop 11, thereby turning off transistor 12. In this manner, the AC voltage $v_s$ can be used to control the maximum current attained in primary winding 31 and the corresponding magnitude of energy stored. FIG. 3 is a diagram showing the current flow in primary winding 31 over a number of 256-kilohertz clock cycles. The envelope of current peaks, shown by a dotted line in FIG. 3, can be represented as the sum of a DC or average current value, $I_p$, determined by reference source 16 and an AC, audio current component, $K_1 v_s$, directly proportional to the AC voltage $v_s$.

When transistor 12 is turned off, no current flows in primary winding 31, the polarity of voltage across secondary winding 32 reverses, and diodes 41 and 42 become forward biased. When diodes 41 and 42 become forward biased, a linearly decreasing ramp of current flows in secondary winding 32 (FIG. 2). This current is transmitted to load 44 via low pass filter 43. The parameters of low pass filter 43 are such that DC and audio are passed and higher frequencies, in particular 256 kilohertz and harmonics thereof, are rejected. Accordingly, the voltage across terminals T and R is substantially constant during each 256-kilohertz clock cycle. Except for losses due to component imperfections, substantially all the energy which has been stored in transformer 30 will be delivered to filter 43 and load 44 during this part of the clock cycle. The current in secondary winding 32 will decrease to zero and no current will flow in either winding 31 or winding 32 until the receipt of the next clock pulse.

If the AC voltage $v_s$ is zero, energy is transferred from the 48 volt battery to transformer 30 and from transformer 30 to load 44 at a constant rate regardless of the DC resistance of load 44. Therefore, a constant magnitude of DC power is delivered to load 44 independent of its DC resistance. In other words, the DC component, $V_{LD}$, of output voltage varies precisely with the DC resistance of load 44 such that constant power is achieved. When the AC voltage $v_s$ is not zero, the output voltage also includes an AC component, $v_{LA}$, resulting in an AC current component, $i_L$, in load 44. Under the assumption that $K_1 v_s < < I_p$, the following equation relating $v_{LA}$, $i_L$, and $v_s$ can be derived:

$$v_{LA} = \frac{2K_1 V_{LD} v_s}{I_p} - \frac{2TV_{LD}^2 i_L}{\eta L I_p^2}, \quad (1)$$

where, T denotes one 256-kilohertz clock period and $\eta$ denotes power conversion efficiency.

A waveform diagram of the voltage across primary winding 31, is shown in FIG. 2. Notice the ringing that occurs after the current in secondary winding 32 has decreased to zero. This ringing is due to energy stored in the distributed capacitance of transformer 30. Means to be described later herein are employed to dissipate this energy to minimize noise and to maintain the desirable constant power characteristic of the circuit.

Figure 4:
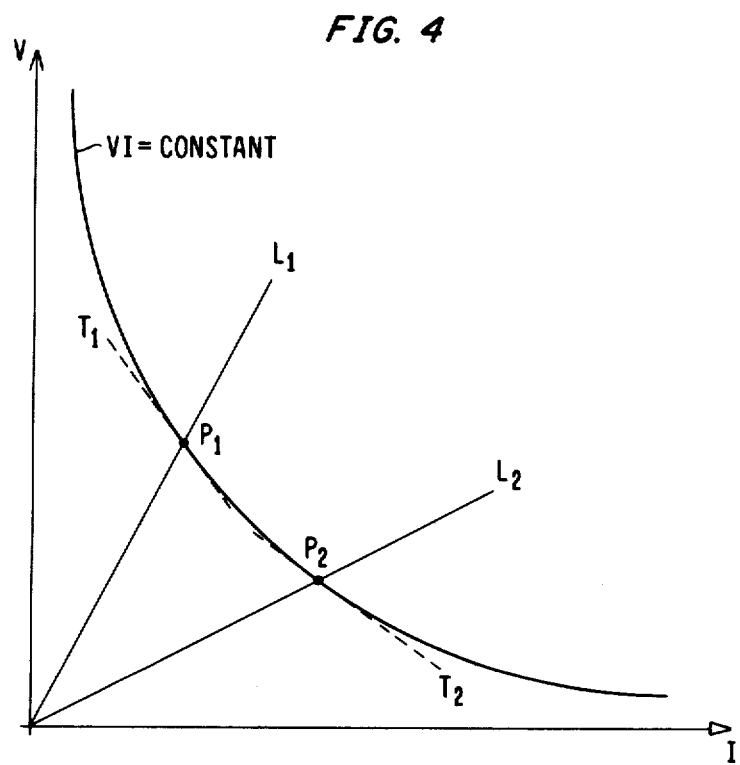
FIG. 4 illustrates the voltage-current characteristic of the power converter shown in FIG. 1.

The dynamic output impedance, $Z_B$, of the constant power battery feed circuit at terminals T and R varies with the DC resistance of load 44. This variation can be better understood with reference to FIG. 4. The voltage-current relationship of a constant power circuit is represented by the hyperbola, $VI = $ constant. Lines $L_1$ and $L_2$ represent the voltage-current relationship defined by two different loads and $P_1$ and $P_2$ represent the operating points of the constant power circuit when connected to those loads. The dynamic output impedance of the power source represented in FIG. 4 is the incremental change in voltage divided by the incremental change in current at a point $$\left(\frac{\Delta V}{\Delta I}\right).$$

The tangent to the V-I curve at a point represents these incremental changes and thus represents the dynamic output impedance. The dynamic output impedance of the constant power circuit is represented by the tangent line $T_1$ when the circuit is operating at point $P_1$, and is represented by the tangent line $T_2$ when the circuit is operating at point $P_2$. In order to use a constant power battery feed to pass audio signals in the telephone line circuit to be described, the dynamic output impedance must be adjusted to a predetermined impedance which is substantially load-independent to assure compatibility with PBXs or other electronic circuits. In the line circuit of the present example, the predetermined impedance is that of a 900-ohm resistor connected in series with a 2.16 microfarad capacitor.

Figure 5:
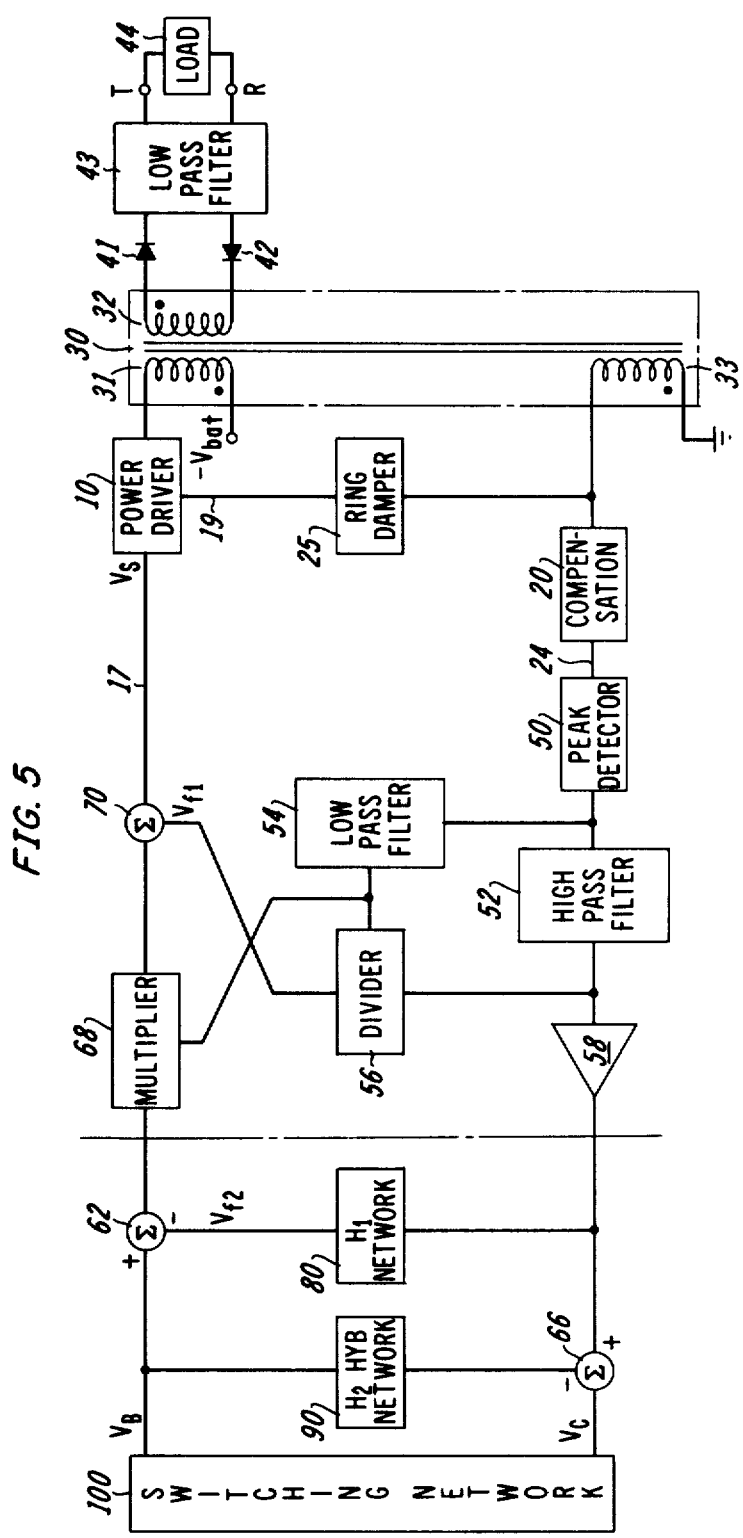
FIG. 5 is a circuit diagram of a line circuit embodying the present invention.

FIG. 5 is a diagram of a telephone line circuit incorporating the flyback power converter just described. The adjustment of dynamic output impedance is accomplished by modifying signals developed across a third winding 33 of transformer 30 and feeding those modified signals back to the input of power driver 10. A first feedback voltage, $v_{f1}$, is generated to provide the tailored adjustment required to make the output impedance load-independent. This is accomplished by making the line feed circuit appear to have an infinite output impedance which can be represented in terms of FIG. 4 by rotating the tangent line representing output impedance clockwise to a vertical position. The amount of rotation required depends on the DC resistance of load 44 and, therefore, on the DC component, $V_{LD}$, of output voltage. Therefore, $v_{f1}$ is made to properly depend on $V_{LD}$. A second feedback voltage, $v_{f2}$, is used to achieve the predetermined output impedance specified for the circuit.

Figure 6:
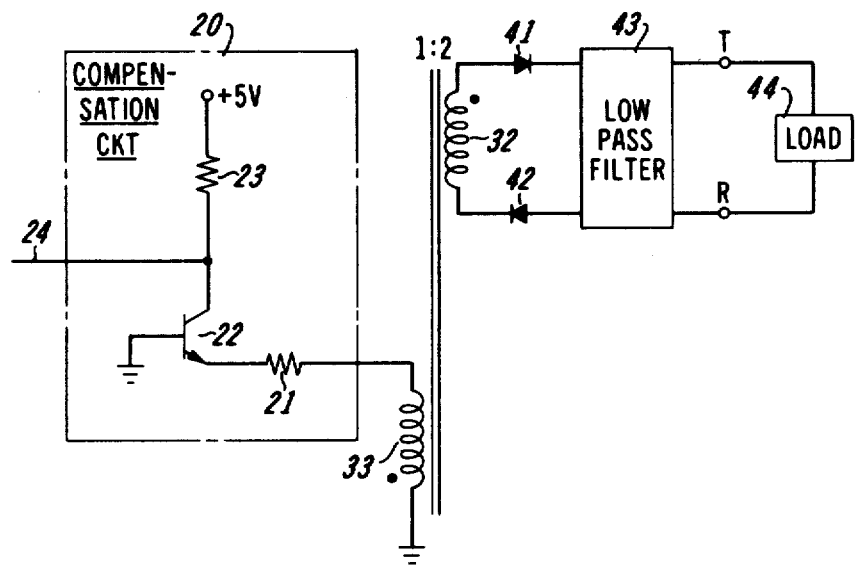

Winding 33 is magnetically coupled to secondary winding 32. In order that feedback voltages $v_{f1}$ and $v_{f2}$ are based on the output voltage across load 44 rather than the voltage across secondary winding 32, the effect of diodes 41 and 42 must be compensated for. Therefore, the voltage across winding 33 is transmitted to a compensation circuit 20, shown in more detail in FIG. 6. Circuit 20 includes a transistor 22, having its emitter connected via a resistor 21 to winding 33, its collector connected via a resistor 23 to a +5 volt source, and its base grounded. The voltage across winding 32 exceeds the output voltage across load 44 by two diode drops—the voltage drops of diodes 41 and 42. Further, the voltage across winding 33 exceeds the voltage across resistor 21 by one diode drop—the base-emitter voltage of transistor 22. Since the voltage across resistor 21 determines the emitter and collector currents in transistor 22 and the ratio of turns in winding 33 to turns in winding 32 is 1:2, it can be seen that the collector current in transistor 22, and its collector voltage, depend on the output voltage across load 44 but are independent of the voltage drops of diodes 41 and 42.

The collector voltage of transistor 22, which is made available on a conductor 24, is inverted and detected by a peak detector 50, which generates a return signal voltage, $K_2 (V_{LD}+v_{LA})$, directly proportional to the output voltage across load 44. The DC component, $K_2 V_{LD}$, of this return signal voltage is obtained by passing the output signal from peak detector 50 through a low pass filter 54 designed to reject frequencies above approximately 25 hertz. In addition, the output of peak detector 50 is passed through a high pass filter 52, which rejects frequencies below approximately 25 hertz, to obtain the AC component, $K_2 v_{LA}$, of the return signal. An analog divider 56 generates the first feedback voltage, $v_{f1}$, by dividing the output signal from high pass filter 52 by the output signal from low pass filter 54. As a result, $$v_{f1} = \frac{K_3 v_{LA}}{V_{LD}}, \quad (2)$$

where $K_3$ denotes a proportionality constant associated with divider 56.

The second feedback voltage, $v_{f2}$, is developed by passing the output signal from high pass filter 52 through an amplifier 58 having a fixed gain, $K_4$, and then passing the amplifier 58 output signal through a network 80 having a voltage transfer function $H_1$. $H_1$ is a frequency dependent function relating the output voltage of network 80 to its input voltage. The particulr form of $H_1$ depends on the predetermined dynamic output impedance to be achieved as will be discussed later herein. The output signal, $v_{f2}$, from network 80 is governed by the following equation:

$$v_{f2} = K_2 K_4 H_1 v_{LA}. \quad (3)$$

An outbound AC voltage, $v_B$, from a switching network 100 (FIG. 5) is combined with feedback voltages $v_{f1}$ and $v_{f2}$ to produce $v_s$, which is the AC voltage applied to power driver 10. First, $v_B$ and $v_{f2}$ are respectively connected to a noninverting input terminal and an inverting input terminal of a voltage summer 62. For reasons to be discussed herein, an analog multiplier 68 multiplies the voltage summer 62 output signal, which is referred to as a difference signal, by $K_2 V_{LD}$, the output signal from low pass filter 54. The multiplier 68 output signal is then added to feedback voltage $v_{f1}$ by a voltage summer 70 to produce $v_s$. The following equation relates $v_s$ to $v_B$, $v_{f1}$, and $v_{f2}$:

$$v_s = K_2 K_5 V_{LD}(v_B - v_{f2}) + v_{f1}. \quad (4)$$

where $K_5$ denotes a proportionality constant associated with multiplier 68.

The outbound AC gain, $G_{out}$, is defined as $$\frac{v_{LA}}{v_B}$$

with the AC impedance, $Z_L$, of load 44 equal to 900 ohms. As has been discussed, the feedback voltage $v_{f1}$ is made to properly depend on $V_{LD}$ so that the dynamic output impedance becomes load-independent. However, since $v_{f1}$ depends on $V_{LD}$, $G_{out}$ would also depend on $V_{LD}$ if analog multiplier 68 were not included in the circuit. By multiplying the output signal from summer 62 by $K_2 V_{LD}$, a gain, $G_{out}$, independent of $V_{LD}$ is advantageously attained.

To determine conditions under which the line circuit of FIG. 5 successfully achieves a predetermined, load-independent output impedance and a gain, $G_{out}$, independent of $V_{LD}$, the following analysis is undergone. As a starting point, the equations labeled (1), (2), (3), and (4) above are combined to yield:

$$v_{LA} = 2K_1 \frac{V_{LD}}{I_p}\left( K_2 K_5 V_{LD} v_B - K_2^2 K_4 K_5 H_1 V_{LD} v_{LA} + \frac{K_3 v_{LA}}{V_{LD}} \right) - \frac{2TV_{LD}^2 i_L}{\eta L I_p^2}. \quad (5)$$

The dynamic output impedance, $Z_B$, is obtained from equation (5) by setting $v_B=0$ and solving for $$Z_B = -\frac{v_{LA}}{i_L},$$

yielding $$Z_B = \frac{\frac{2TV_{LD}^2}{\eta L I_p^2}}{1 - \frac{2K_1 K_3}{I_p} + \frac{2K_1 K_2^2 K_4 K_5 H_1 V_{LD}^2}{I_p}}. \quad (6)$$

By inspecting equation (6), it is seen that $Z_B$ will be independent of $V_{LD}$ if $$I_p = 2K_1 K_3. \quad (7)$$

Under that condition, $$Z_B = \frac{T}{\eta L I_p K_1 K_2^2 K_4 K_5 H_1}. \quad (8)$$

Therefore, to obtain a predetermined value of $Z_B$, the voltage transfer function, $H_1$, of network 80 must be given by:

$$H_1 = \frac{T}{\eta L I_p K_1 K_2^2 K_4 K_5} \cdot \frac{1}{Z_B}. \quad (9)$$

It should be noted that the last term in the denominator of the expression given by equation (6) would not be present if the second feedback voltage, $v_{f2}$, were not included in the circuit. Under that circumstance, applying the condition of equation (7) would result in an infinite output impedance $Z_B$.

A particular realization of network 80, shown in FIG. 8, comprises a capacitor 81 having capacitance C, a resistor 82 having resistance R, and an amplifier 83 having gain A. To achieve the desired output impedance $Z_B$—being that of a 900-ohm resistor in series with a 2.16-microfarad capacitor—the parameters of network 80 must satisfy the following conditions:

$$RC = (900 \text{ ohms})(2.16 \ \mu f) = 1.944 \text{ msec},\quad (10)$$

and $$A = \frac{T}{\eta L I_p K_1 K_2^2 K_4 K_5 R}. \quad (11)$$

The outbound AC gain, $G_{out}$, is also obtained from equation (5) by using the conditions of equations (7) and (9) and making the substitution $$i_L = \frac{v_{LA}}{Z_L}$$

with $Z_L$ equal to 900 ohms as required by the definition of $G_{out}$, yielding $$G_{out} = \frac{v_{LA}}{V_B} = \frac{\eta L I_p K_1 K_2 K_5}{T} \cdot \frac{Z_B Z_L}{Z_L + Z_B}. \quad (12)$$

Since $Z_L$ is equal to 900 ohms and $Z_B$ is independent of $V_{LD}$ as given by equation (8), $G_{out}$ is also independent of $V_{LD}$.

In addition to transmitting AC signals from switching network 100 to load 44, the line circuit of FIG. 5 is also capable of transmitting AC signals originating at load 44 to switching network 100. For AC purposes, load 44 can be represented by an AC voltage source, $v_A$, connected in series with an impedance, $Z_L$ (FIG. 9). Assuming no outbound AC signal—i.e., $v_B = 0$—the AC component, $v_{LA}$, of voltage across terminals T and R will result solely from the AC signal, $v_A$. Because of the magnetic coupling of windings 32 and 33 and the operation of compensation circuit 20, peak detector 50, high pass filter 52, and amplifier 58 as has been discussed herein, the amplifier 58 output voltage, $K_2 K_4 v_{LA}$, is directly proportional to $v_{LA}$. To assure that the presence of an outbound AC signal, $v_B$, will have no effect on an inbound AC signal, $v_C$, transmitted to switching network 100, a hybrid network 90 is required. Network 90 has a frequency-dependent, voltage transfer function, $H_2$, relating the output voltage of network 90 to its input voltage. Outbound AC signal $v_B$ is passed through hybrid network 90 and the network 90 output signal, which is referred to as a hybrid signal, and the output signal from amplifier 58 are respectively connected to an inverting input terminal and a noninverting input terminal of a voltage summer 66. The output signal from summer 66 is the inbound AC signal, $v_C$. Accordingly, the following equation holds:

$$v_C = K_2 K_4 V_{LA} - H_2 v_B. \quad (13)$$

$H_2$ must be chosen such that any voltage at the output terminal of amplifier 58 due to $v_B$ is canceled by the output signal from hybrid network 90. To determine $H_2$, the result given by equation (12) is substituted into equation (13). (In this case, $Z_L$ is not restricted to the value, 900 ohms, but represents the AC impedance of load 44.) Applying the condition that the inbound AC signal, $v_C$, is zero when $v_A$ is zero, yields:

$$H_2 = \frac{\eta L I_p K_1 K_2^2 K_4 K_5}{T} \cdot \frac{Z_B Z_L}{Z_L + Z_B}. \quad (14)$$

As is seen from equation (14), $H_2$ must depend on $Z_L$, the AC impedance of load 44. $Z_L$ will vary depending on whether the line circuit of the present example is connected to a subscriber set, a PBX, or some other electronic circuit and on whether the loop used for connection is loaded or nonloaded. In the case of a nonloaded loop connected to a subscriber set, $Z_L$ can be represented as a parallel connection having an 800-ohm resistor in one branch and a 100-ohm resistor in series with a 0.05-microfarad capacitor in the other branch. A particular realization of hybrid network 90 corresponding to this case is shown in FIG. 10 as comprising three resistors 91, 92, and 93 having resistances $R_0$, $R_1$, and $R_2$, respectively, two capacitors 94 and 95 having capacitances $C_1$ and $C_2$, respectively, and an amplifier 96 having gain $A_1$. To achieve the transfer function $H_2$ required by equation (14), the following conditions must be met:

$$R_0 = 800a \text{ ohms} \quad (15)$$

$$R_1 = 100a \text{ ohms} \quad (16)$$

$$R_2 = 900a \text{ ohms} \quad (17)$$

$$C_1 = 0.05/a \ \mu f \quad (18)$$

$$C_2 = 2.16/a \ \mu f \quad (19)$$

$$A_1 = \frac{800 a \eta L I_p K_1 K_2^2 K_4 K_5}{T} \quad (20)$$

where $a$ is an arbitrary constant. Realizations of networks corresponding to different load conditions can be derived using well-known methods. If one line circuit is to be used at different times in conjunction with several different typs of loads, the required networks can be switched in and out of the circuit accordingly.

The proportionality constants $K_1$ through $K_5$ associated with various circuits included in the line circuit of FIG. 5 can be readily adjusted to meet the conditions developed in the preceding analysis by means well known in the art. For example, if the measured ratio of output voltage to the product of input voltages for a particular analog multiplier used to implement multiplier 68 is not the desired constant $K_5$, an appropriate scaling amplifier can be used to achieve the proper proportionality.

Figure 7:
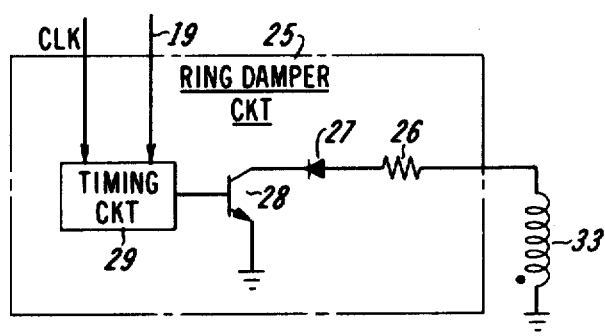

As has been discussed, it is desirable to dissipate the energy stored in the distributed capacitance of transformer 30, which would otherwise result in ringing voltage across primary winding 31. To accomplish this, winding 33 is connected to a ring damper circuit 25 (FIG. 7) comprising a transistor 28, having its emitter grounded, its collector connected to winding 33 via a diode 27 and a series-connected resistor 26, and its base driven by a timing circuit 29. During this portion of each cycle when current is flowing in primary winding 31 (FIG. 2), the voltage across winding 33 is positive and transistor 28 must be maintained off by timing circuit 29 in order that energy can be stored in transformer 30. When comparator 15 (FIG. 1) generates a pulse, current stops flowing in primary winding 31 and begins to flow in secondary winding 32. Timing circuit 29 provides base voltage to transistor 28, but no collector current can flow because the voltage across winding 33 is negative and diode 27 is reverse-biased. However, when the current in secondary winding 32 is reduced to zero, the voltage across winding 33 swings positive during the first cycle of ringing. Accordingly, diode 27 becomes forward biased, transistor 28 conducts current, and resistor 26, which is chosen for critical damping, dissipates the ringing energy. Timing circuit 29 receives the 256-kilohertz clock and, via a conductor 19, the output of comparator 15 and derives a signal by well-known means to control transistor 28.

It is to be understood that the above-described embodiment is merely illustrative of the principles of the invention and that other embodiments may be devised by those skilled in the art without departing from the spirit and scope of the invention. For example, the line circuit of FIG. 5 is described in terms of a voltage-mode implementation. A current-mode implementation using complementary bipolar integrated circuitry may also be advantageously employed. Further, the portion of the line circuit shown to the left of the dotted line in FIG. 5 may be conveniently implemented in CMOS switched-capacitor technology because of the frequency responsive characteristics required in that part of the circuit. In that case, the inputs to voltage summers 62 and 66 may be scaled by appropriate constants, $c_1$ through $c_4$, to reduce the circuit's vulnerability to noise. The effect of these constants on the above analysis will be understood by considering the equivalence of the two circuits shown in FIGS. 11 and 12. FIG. 11 is a circuit diagram of a portion of the line circuit of FIG. 5 and FIG. 12 is an alternative embodiment of the circuit of FIG. 11 for implementation in CMOS technology.

What is claimed is:

1. A power supply circuit for applying power to a load having a DC resistance comprising:
   means for applying a DC voltage to said load such that a substantially fixed magnitude of DC power is supplied to said load independent of said DC resistance;
   means for applying an AC voltage to said load;
   feedback means coupled to said load for generating a return signal representing the voltages across said load;
   filter means for separating said return signal into a DC component and an AC component;
   divider means for generating a feedback signal that is substantially, directly proportional to the quotient resulting from the division of said AC component by said DC component; and
   means responsive to said feedback signal for supplying an AC current to said load.

2. A power supply circuit for applying power to a load having a DC resistance comprising:
   means for applying a DC voltage to said load such that a substantially fixed magnitude of DC power is supplied to said load independent of said DC resistance;
   means for applying an AC voltage to said load;
   feedback means coupled to said load for generating a return signal representing the voltages across said load;
   filter means for separating said return signal into a DC component and an AC component;
   divider means for generating a first feedback signal that is substantially, directly proportional to the quotient resulting from the division of said AC component by said DC component;
   means responsive to said AC component for generating a second feedback signal, the relationship of said second feedback signal to said AC component being defined by a transfer function that is substantially equal to the quotient resulting from the division of a constant by a predetermined impedance;
   means responsive to said first and second feedback signals for generating a control signal; and
   means responsive to said control signal for supplying an AC current to said load.

3. A line circuit comprising:
   power supply means for supplying an output voltage to a load having a DC resistance, said output voltage having a DC component depending upon said DC resistance such that a substantially fixed magnitude of DC power is supplied to said load independent of said DC resistance, wherein said power supply means is responsive to a control signal for supplying a first AC component of said output voltage to said load;
   feedback means coupled to said load for generating a return signal representing the voltages applied to said load;
   filter means for separating said return signal into a DC component and an AC component;
   divider means for generating a first feedback signal that is substantially, directly proportional to the quotient resulting from the division of said AC component of said return signal by said DC component of said return signal;
   means for generating an outbound AC signal; and
   means for generating said control signal by summing said first feedback signal and said outbound AC signal.

4. A line circuit comprising:
   power supply means for supplying an output voltage to a load having a DC resistance, said output voltage having a DC component depending upon said DC resistance such that a substantially fixed magnitude of DC power is supplied to said load independent of said DC resistance, wherein said power supply means is responsive to a control signal for supplying a first AC component of said output voltage to said load;
   feedback means coupled to said load for generating a return signal representing the voltages applied to said load;
   filter means for separating said return signal into a DC component and an AC component;
   divider means for generating a first feedback signal that is substantially, directly proportional to the quotient resulting from the division of said AC component of said return signal by said DC component of said return signal;
   means for generating an outbound AC signal;
   coupling means for generating a representation of said outbound AC signal; and
   means for generating said control signal by summing said first feedback signal and said representation of said outbound AC signal.

5. A line circuit as claimed in claim 4 wherein said coupling means includes means for generating said representation of said outbound AC signal as being substantially, directly proportional to the product of said outbound AC signal and said DC component of said return signal.

6. A line circuit as claimed in claim 4 further comprising:

means responsive to said AC component of said return signal for generating a second feedback signal, the relationship of said second feedback signal to said AC component of said return signal being defined by a first transfer function that is substantially equal to the quotient resulting from the division of a first constant by a first predetermined impedance; and wherein said coupling means includes means for generating a difference signal by subtracting said second feedback signal from said outbound AC signal and means for generating said representation of said outbound AC signal as being substantially, directly proportional to the product of said difference signal and said DC component of said return signal.

7. A line circuit as claimed in claim 4 further comprising:

amplifier means for generating an amplifier signal that is substantially, directly proportional to said AC component of said return signal;

means responsive to said amplifier signal for generating a second feedback signal, the relationship of said second feedback signal to said amplifier signal being defined by a first transfer function that is substantially equal to the quotient resulting from the division of a first constant by a first predetermined impedance; and wherein said coupling means includes means for generating a difference signal by subtracting said second feedback signal from said outbound AC signal and means for generating said representation of said outbound AC signal as being substantially, directly proportional to the product of said difference signal and said DC component of said return signal.

8. A line circuit as claimed in claim 7 further comprising:

means responsive to said outbound AC signal for generating a hybrid signal, the relationship of said hybrid signal to said outbound AC signal being defined by a second transfer function that is substantially equal to the product of a second constant and the impedance of the parallel combination of said first predetermined impedance and a second predetermined impedance; and means for generating an inbound AC signal by subtracting said hybrid signal from said amplifier signal.

9. A line circuit as claimed in claim 7 further comprising:

means for applying a second AC component of voltage to said load; and means for generating an inbound AC signal by subtracting from said amplifier signal a component of said amplifier signal resulting from said first AC component of said output voltage and being independent of said second AC component of said output voltage.

10. A line circuit as claimed in claim 3, 4, 5, 6, 7 or 8 further comprising means for applying a second AC component of voltage to said load.

11. A line circuit as claimed in claim 10 wherein said power supply means comprises:

a transformer having a primary winding connected to an electrical power source and a secondary winding connected to said load;

a switching device connected to said primary winding for controlling current flow in said primary winding;

sensing means for generating a monitor signal representing current flow in said primary winding;

pulse generator means for turning on said switching device to allow current flow in said primary winding; and means responsive to said monitor signal and said control signal for turning off said switching device to prevent current flow in said primary winding.

12. A line circuit as claimed in claim 11 wherein said feedback means comprises:

sense winding means magnetically coupled to said secondary winding for generating a signal representing current flow in said secondary winding; and peak detector means responsive to said signal generated by said sense winding means for generating said return signal.

* * * * *